March 16, 1971 S. A. SPADT 3,570,839
SHEAR GAUGE LOCKING DEVICE
Filed April 18, 1969 2 Sheets-Sheet 1
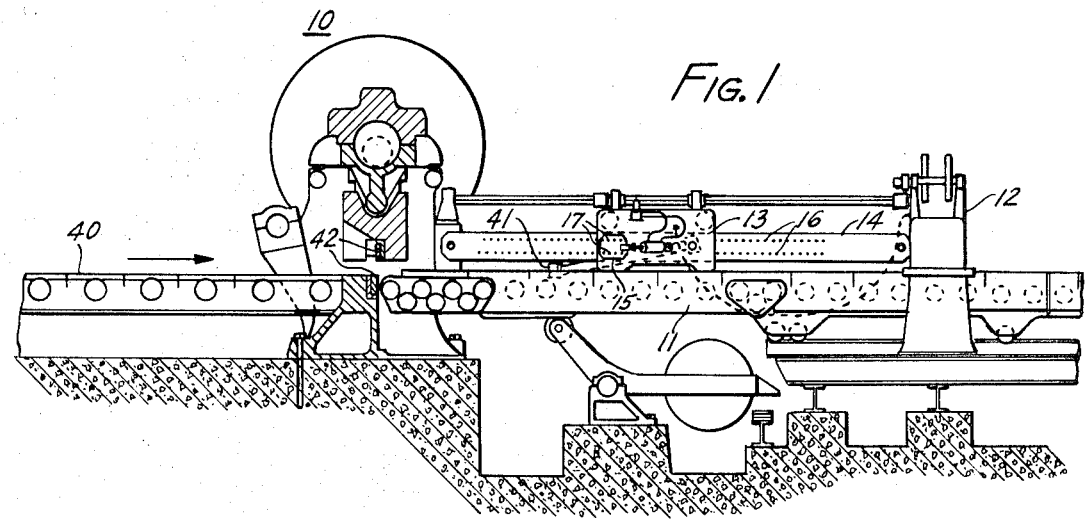
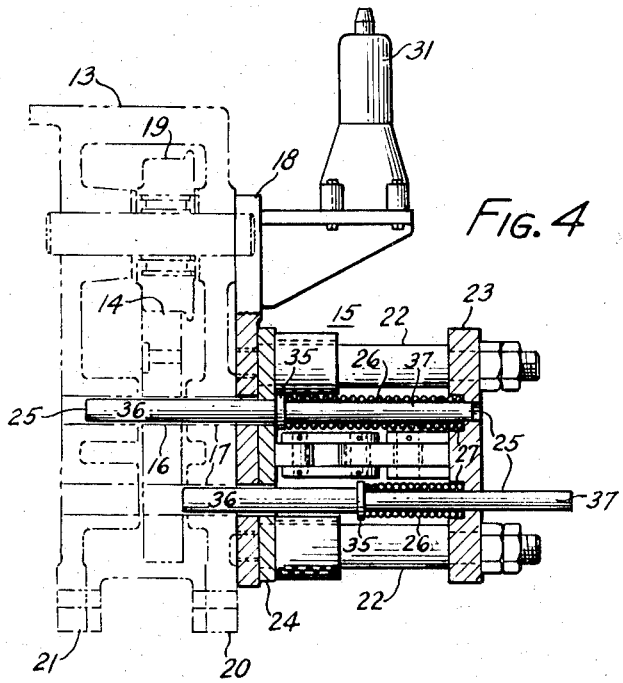
INVENTOR
Stanley A. Spadt INVENTOR
Stanley A. Spadt

United States Patent Office 3,570,839
Patented Mar. 16, 1971

3,570,839
SHEAR GAUGE LOCKING DEVICE
Stanley A. Spadt, Bethlehem, Pa., assignor to
Bethlehem Steel Corporation
Filed Apr. 18, 1969, Ser. No. 817,506
Int. Cl. B23q 3/18
U.S. Cl. 269—315                                        3 Claims

ABSTRACT OF THE DISCLOSURE

Apparatus for positioning a workpiece with respect to a work station which includes an automatic device for locking a positioning gauge in a preselected location.

BACKGROUND OF THE INVENTION

In the manufacture of many rolled steel products a shear is provided which cuts billets into desired lengths. A known apparatus for establishing the desired length of billet includes a shear gauge which is reciprocable relative to the shear runout table with means for locking the gauge at a preselected location. The known apparatus, however, requires the operator to move the shear gauge to the desired location by any convenient means, and then to manually insert a locking pin into aligned guide holes in the carriage and in the runout table. The operator must leave his station in the pulpit to accomplish the locking of the shear gauge manually and return thereto to continue operation of the billet shear. The time consumed and the attendant loss of production will be readily apparent to those skilled in the art.

It is an object of this invention to provide apparatus which will automatically lock a gauge carriage at a preselected location relative to a work station.

It is a further object of the invention to provide remotely controlled automatic means to secure a desired gauge setting.

SUMMARY OF THE INVENTION

The instant invention accomplishes these objects by providing apparatus comprising a gauge carriage having a plurality of locking pins adapted to selectively register with holes in the gauge carriage supporting track thus securing the gauge carriage at a preselected location. The apparatus further comprises remotely controlled actuating means for (a) releasing biasing means for moving locking pins toward the supporting track and (b) for biasing said pins away from said track.

BRIEF DESCRIPTION OF THE DRAWINGS

FIG. 1 is a general arrangement of an installation employing apparatus according to the instant invention;

FIG. 4 is a sectional view taken on line 4—4 of FIG. 3 showing the locking device engaged.

DESCRIPTION OF THE PREFERRED EMBODIMENT

Figure 2:
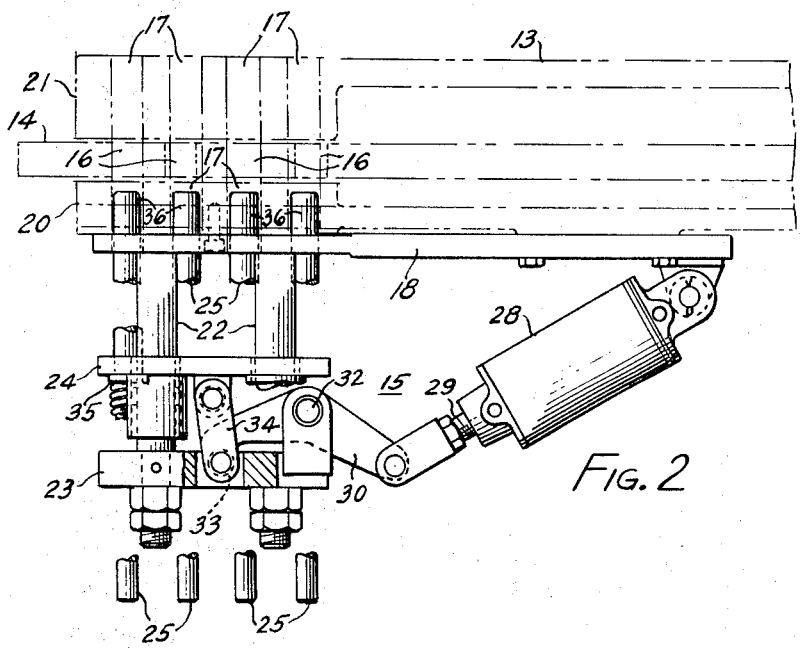
FIG. 2 is a plan view of the apparatus with the locking pins disengaged.

Referring now to the drawings for a detailed description of the invention and particularly to FIG. 1, the apparatus is seen to comprise generally a billet shear 10, runout table 11, gauge stand 12, gauge carriage 13, rails 14 and gauge locking device 15. A workpiece to be cut into desired lengths is advanced over roller table 40 from the mill to the shear until the head end contacts the gauge head 41 which is mounted on gauge carriage 13. The gauge head 41 stops the workpiece at the desired point between the shear knives 42 and the shear is actuated to cut the piece. The gauge carriage 13 is adapted to be moved on the rails 14 by any convenient means (not shown) e.g. a cable and winch arrangement or a motor driven screw to establish the preselected distance from the shear blades 42 so that a proper cut is made.

Rails 14 are provided with a double row of staggered holes 16 over substantially the length of the rails. Gauge carriage 13 is provided with a group of eight holes 17 comprised of a double row of four equally spaced holes in each row. The rows of holes in the gauge carriage 13 are aligned horizontally with the rows of holes in one of the rails 14 and are adapted to selectively register with the holes in that rail so that at any gauge setting a hole in the carriage frame lines up with a hole in the rail. A locking pin 25 is inserted into the matching set of holes to lock the carriage 13 at the desired location along the rail. Heretofore the locking pin has been manually placed in the properly aligned holes but the instant invention eliminates the necessity for the manual operation as will be evident from the description that follows.

Figure 3:
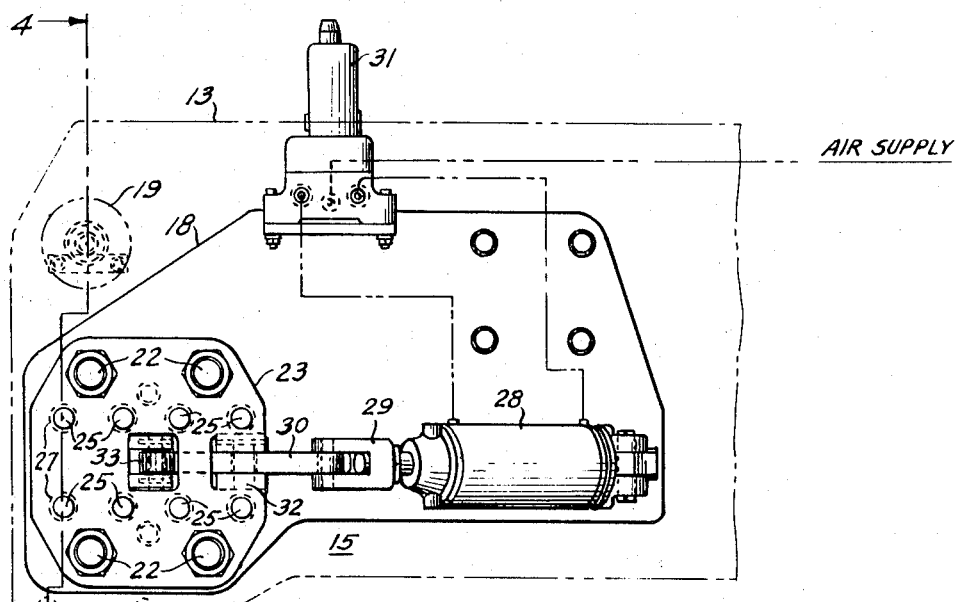
FIG. 3 is a side elevational view of the device shown in FIG. 2.

Referring now to FIGS. 2, 3 and 4 the gauge locking device 15 of the instant invention will be described in detail a portion of the gauge carriage 13 is seen in the figures with the locking device 15 of the instant invention attached thereto. The housing for the locking device 15 comprises bracket 18, guide posts 22, spring retaining plate 23, pressure plate 24, spring-loaded locking pins 25, double-acting fluid-operated pistons 28 and solenoid 31. The locking device is removably attached to the gauge carriage in a manner so as to align a double row of spaced apart holes with a similar double row of holes 17 in said gauge carriage 13. The holes 17 in gauge carriage 13 are seen to pass through two sections 20 and 21 of the carriage housing, said sections being separated for passage of a rail 14 therethrough. The carriage is supported on a pair of rails 14 by wheels 19 which provide means for reciprocating the carriage longitudinally thereon. It is by means of inserting a pin throug the holes 17 in the carriage and the holes 16 in the rail 14 that the carriage is locked firmly in a desired location.

The bracket 18 which is attached to the outside section 20 of the carriage 13 is provided with a group of four tapped holes for attaching four guide posts 22 which have a threaded portion at one end. A spring retaining plate 23 is attached to the other end of said guide posts 22 and bolted thereto to form a rigid housing. A double row of inwardly facing counterbored holes 27 is provided in the retaining plate 23 for purposes to be described. A pressure plate 24 is slidably mounted on guide posts 22 within the rigid housing and is provided with a double row of spaced apart holes to align with said group of holes 17 in the gauge carriage 13.

The locking device 15 is provided with eight spring loaded locking pins 25 in registry with the holes in the carriage. The locking pins are designed with a collar 35 intermediate the ends thereof. The action end 36 of the locking pin 25 on one side of the collar 35 is designed to suit the mounting bracket pin guide holes. The shank end 37 of the locking pin on the other side of said collar is of a smaller diameter extending through a compression spring 26 and guide holes in the spring retaining plate 23. The compression spring is seated one end on the collar of the locking pin and the other end in the aforementioned counterbore 27 in the spring retaining plate 23.

The pressure plate 24 which rides freely on the four guide posts 22 is actuated by air cylinder 28 with rod end 29 connected through bell crank 30 and link 34 to the pressure plate. A solenoid 31 is energized through a signal from the operator's pulpit to actuate the air cylinder 28. The rod end 29 of air cylinder 28 connected to bell crank 30 extends thus pivoting bell crank about pivot point 32. The action end 33 of bell crank 30 acting through link 34 biases pressure plate 24 toward the gauge carriage and rail. As hereinbefore noted for any setting of the gauge carriage one set of guide holes will line up. As the pressure plate 24 riding free on the guide posts 22 advances under the influence of the air cylinder 28 the locking pins 25 are biased forward at the same time by the expanding compression springs 26 working against the locking pin collar 35. One of the locking pins is free to pass through the guide holes in both sections 20 and 21 of the carriage and therefore through a hole 16 in the rail 14 thus effectively locking the carriage in a desired position, as shown in FIG. 4. The remaining seven pins buck against the solid portion of the carriage track plate or rail 14 with their related springs 26 remaining partially compressed. The pressure plate 24 is withdrawn by reversing the action of the air cylinder and the pressure plate forcing against the pin collars fully compresses the springs against the retaining plate 23 thus biasing the plurality of locking pins 25 away from the rail 14 including the one locking pin which was inserted in the properly registered hole in the rail.

Gauge carriage 13 is positioned at a preselected distance from the work station 10, in this case a billet shear, by means of a motor driven winch and cable arrangement remotely on a signal from the operator's pulpit. A roller table 11 integral with the work station 10 advances the workpiece by means of live rollers toward the preset gauge 13. A pair of rails 14 mounted parallel to and slightly above said roller table 11 provides tracks on which gauge carriage 13 is reciprocated longitudinally. When the preselected position for the gauge carriage has been established another signal from the operator's pulpit energizes solenoid 31 which in turn activates means to actuate the locking device. One of the locking pins will automatically be inserted into the properly registered holes in the gauge carriage and rails to effectively lock the carriage in position, whereupon a plurality of cuts can be made on a workpiece. Changes to a different length cut are quickly and easily made by remote control. The gauge head 41 is lifted out of the way after each cut by motor controlled means activated from the pulpit.

The preferred embodiment shown in the figures and described herein is designed so that the spacing of holes in the track rail and in the carriage using eight spring-loaded locking pins will provide a high degree of accuracy in cutting billets of desired length. It will be obvious to those skilled in the art that a simple rearrangement of hole spacing and/or number of locking pins per group will provide greater or less accuracy as required.

I claim:

1. In apparatus for positioning a workpiece at a preselected location with respect to a work station, said apparatus comprising a movable gauge carriage, rails supporting said carriage for longitudinal movement thereon, a plurality of spaced apart holes in at least one of said rails, a plurality of holes in said gauge carriage each said hole adapted to selectively register with one of said holes in said rails, the improvement comprising:
    (a) a housing mounted on said carriage,
    (b) a plurality of pins mounted in said housing in registry with the holes in said carriage,
    (c) means for biasing said plurality of pins toward one of said rails so that at least one of said pins will be inserted in properly registered hole in said rail, and
    (d) means for biasing said plurality of pins away from said rail so that said pin inserted in properly registered hole in said rail is withdrawn therefrom.

2. Apparatus according to claim 1 wherein means recited in subparagraph (c) are compression springs.

3. Apparatus according to claim 1 wherein the means recited in subparagraph (d) includes a remotely controlled double acting fluid operated piston.

References Cited

UNITED STATES PATENTS

| | | | |
|---|---|---|---|
| 954,396 | 4/1910 | Klindworth | 83—467 |
| 3,492,900 | 2/1970 | Hill | 83—467X |

WILLIAM S. LAWSON, Primary Examiner

D. D. EVENSON, Assistant Examiner

U.S. Cl. X.R.

83—467; 269—70